US008333950B2

(12) United States Patent
Krampitz et al.

(10) Patent No.: US 8,333,950 B2
(45) Date of Patent: Dec. 18, 2012

(54) PROCESS FOR THE PREPARATION OF LITHIUM METAL OXIDES INVOLVING FLUIDIZED BED TECHNIQUES

(75) Inventors: Horst Krampitz, Pohle (DE); Michael Fooken, Seelze (DE); Wilhelm Sellmann, Stadthagen (DE)

(73) Assignee: Honeywell International Inc., Morristown, NJ (US)

( * ) Notice: Subject to any disclaimer, the term of this patent is extended or adjusted under 35 U.S.C. 154(b) by 162 days.

(21) Appl. No.: 12/858,048

(22) Filed: Aug. 17, 2010

(65) Prior Publication Data

US 2011/0052484 A1    Mar. 3, 2011

Related U.S. Application Data

(60) Provisional application No. 61/237,464, filed on Aug. 27, 2009.

(51) Int. Cl.
*C01D 1/02* (2006.01)
*C01G 45/12* (2006.01)

(52) U.S. Cl. ................................ 423/594.15; 423/599

(58) Field of Classification Search .................. 423/599, 423/594.15, 593.1, 594.2, 594.4, 594.6, 596, 423/598, 600, 594.8, 594.12, 594.13
See application file for complete search history.

(56) References Cited

U.S. PATENT DOCUMENTS

| | | | | |
|---|---|---|---|---|
| 5,108,979 | A * | 4/1992 | Magnabosco et al. | 502/304 |
| 5,874,058 | A * | 2/1999 | Sheargold et al. | 423/599 |
| 6,004,526 | A * | 12/1999 | Sugimoto et al. | 423/599 |
| 6,383,683 | B1 * | 5/2002 | Nagayama et al. | 429/224 |
| 6,409,985 | B1 * | 6/2002 | Numata et al. | 423/599 |
| 6,423,294 | B2 | 7/2002 | Manev et al. | |
| 6,875,416 | B1 * | 4/2005 | Benz et al. | 423/594.15 |
| 7,488,464 | B2 * | 2/2009 | Hammel et al. | 423/592.1 |
| 7,968,231 | B2 * | 6/2011 | Amine et al. | 429/231.1 |
| 2001/0014421 | A1 * | 8/2001 | Shirakawa et al. | 429/224 |
| 2005/0169833 | A1 * | 8/2005 | Spitler et al. | 423/594.15 |
| 2007/0148545 | A1 * | 6/2007 | Amine et al. | 429/231.1 |
| 2007/0207385 | A1 | 9/2007 | Liu | |
| 2008/0247931 | A1 * | 10/2008 | Domesle et al. | 423/263 |

FOREIGN PATENT DOCUMENTS

| | | |
|---|---|---|
| JP | 11-049519 | 2/1999 |
| JP | 2006-151707 | 6/2006 |
| KR | 10/2007-0082900 | 8/2001 |
| WO | 98/40312 A1 | 9/1998 |

OTHER PUBLICATIONS

Uzunova et al., "A low external temperature method for synthesis of active electrode materials for Li batteries—Part A: Synthesis of pure manganese spinel", Journal of Applied Electrochemistry (2005)35: 117-122.*

(Continued)

*Primary Examiner* — Colleen Dunn
*Assistant Examiner* — Anthony J Zimmer
(74) *Attorney, Agent, or Firm* — Kenyon & Kenyon LLP

(57) ABSTRACT

A method of producing lithium metal oxides can include mixing lithium salt and a metal oxide to form a composition, heating the composition in a first reactor, transferring the composition to a second reactor, and passing the composition through the second reactor to anneal the composition to form lithium metal oxides. The second reactor can be a fluidized bed reactor. The lithium metal oxide can have an average crystal size of between about 5 microns and about 20 microns.

16 Claims, 2 Drawing Sheets

OTHER PUBLICATIONS

Taniguchi et al., "Synthesis of Nanostructured LiM0.15Mn1.85O4 (M=Mn, Co, Al, and Fe) Particles by Spray Pyrolysis in a Fluidized Bed Reactor", Chem. Eng. Comm., 195:1292-1301, 2008.*

D. Guyomard et al., "Rechargeable $Li_{1+x}Mn_2O_4$/Carbon Cells with a New Electrolyte Composition: Potentiostatic Studies and Application to Practical Cells," *J. Electrochem. Soc.*, vol. 140, No. 11, Nov. 1993, pp. 3071-3081.

Izumi Taniguchi et al., "Preparation of $LiMn_2O_4$ Powders via Spray Pyrolysis and Fluidized Bed Hybrid System," AIChE Journal, vol. 52, No. 7, Jul. 2006, pp. 2413-2421.

* cited by examiner

PROCESS FOR THE PREPARATION OF LITHIUM METAL OXIDES INVOLVING FLUIDIZED BED TECHNIQUES

RELATED APPLICATIONS

This application claims the benefit of U.S. Provisional Patent Application Ser. No. 61/237,464, filed on Aug. 27, 2009, currently pending. The disclosure of the Provisional application is hereby incorporated by reference in its entirety.

FIELD OF THE INVENTION

The present technology relates to the field of lithium metal oxides. In particular, the present technology relates to a method of preparing lithium metal oxides using fluidized bed techniques.

DESCRIPTION OF RELATED ART

Lithium metal oxides are playing an increasing role in electrochemical cells such as for use in batteries due to their lower cost, availability, safety, environmental acceptance and electrochemical performance. Rechargeable lithium batteries produced using these oxides have many applications, for example, use in portable electronic equipment such as video cameras, mobile telephones or laptop computers.

Lithium manganese oxide is an example of a lithium metal oxide used in electrochemical cells. One method of producing lithium metal oxides is through the thermal reaction of a lithium and a manganese-containing salt. Mixtures of lithium compounds are prepared with appropriate metal compounds and, if necessary, dried. Once the lithium compounds are prepared, the lithium and manganese-containing salts are mixed and heated in a solid state.

According to one method, the mixing, heating and solid state reaction takes place in a single reactor, such as an autoclave, a rotary furnace, or a pusher furnace. For example, a method of preparing a single phase lithiated manganese oxide intercalation compound is disclosed in WO 98/40312 in which lithium hydroxide or a decomposable lithium salt and a manganese oxide or decomposable manganese salt are intimately mixed in stoichiometric amounts and then fed into a reactor where they are continuously agitated while air, oxygen or oxygen enriched gas is passed through the reactor, heated at a temperature of from about 650° C. and about 800° C. and then cooled to less than about 100° C.

While autoclaves require lower amounts of energy to run the reaction and allow good control of the mixture, the resulting product mixture may be not very well crystallized. To refine the crystallinity of the mixture, it is subjected to a short heating or annealing treatment in a rotary furnace for about two hours. Thus, according to another method, the mixture may first be placed in a pusher furnace for the solid state reaction at lower temperatures and then placed in a rotary furnace at higher temperatures to anneal and refine the crystallinity of the product.

While the above methods are effective at producing lithium metal oxides, the known processes of making lithium metal oxides lead to batch-to-batch inconsistencies. For example, because the mixture is layered within the rotary furnace, some of the oxygen is spun off during the heating step and the mixture may not have a homogeneous partial pressure distribution. This can lead to varying results depending on the particular batch. In addition, the volatility of lithium at high temperatures may result in poor yields. Furthermore, the reaction time for producing the lithium metal oxides can be lengthy due to the poor thermal conductivity of the material.

SUMMARY OF THE INVENTION

The present technology relates to methods of producing lithium metal oxides. The method includes mixing a lithium salt and a metal oxide to form a mixture, heating the mixture in a first reactor to form a crude product, and annealing the crude product in a second reactor to form an annealed product comprising lithium metal oxide, wherein the second reactor is a fluidized bed. The lithium metal oxide can have an average crystal size of about 5 microns to about 20 microns and an average BET ("Brunauer-Emmett-Teller") surface of about 0.5 to about 2.5 $m^2/g$.

While multiple embodiments are disclosed, still other embodiments of the present technology will become apparent to those skilled in the art from the following detailed description, which shows and describes illustrative embodiments of the present technology. Accordingly, the drawings and detailed description are to be regarded as illustrative in nature and not restrictive.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
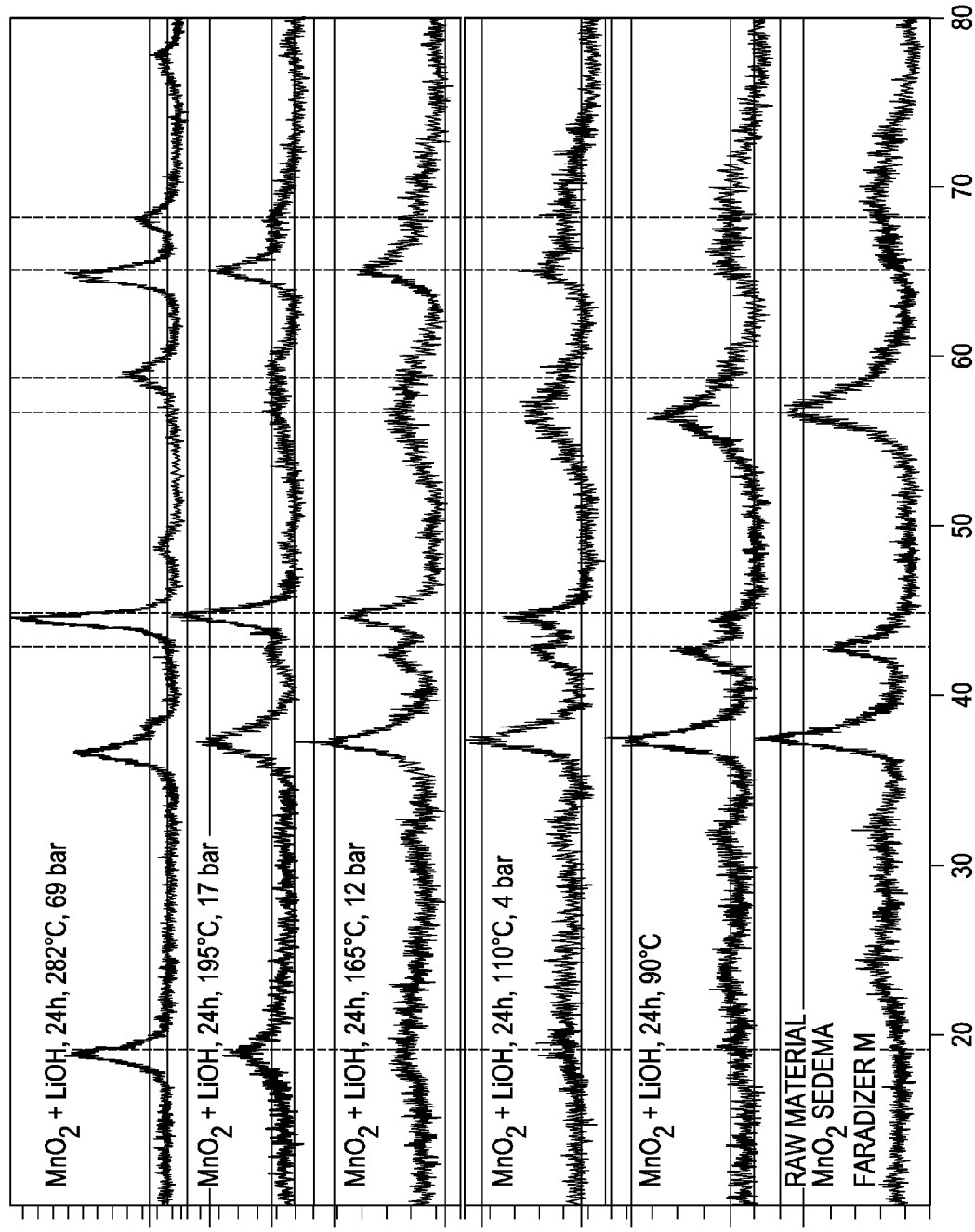
FIG. 1 is an X-ray diffraction (XRD) diagram of $MnO_2$ starting material and materials obtained by hydrothermal treatment at varying temperatures.

Lithium metal oxides produced in accordance with the processes present technology can have improved properties, such as increased batch-to-batch consistency. Without being bound by any particular theory, it is believed that these improvements can be obtained by controlling the oxygen content during an annealing step, in addition to controlling the lithium content because the lithium content and the oxygen content in the lithium metal oxide relate to each other via the manganese oxidation state, and thus have an impact upon both the batch consistency and the desired crystallinity of the final product.

The processes for preparing lithium metal oxides of the present technology include the use of two reactors, where the first reactor can be used for the formation of a crude product, and the second reactor can be used to perform an annealing step. For example, a mixture of a lithium salt, a metal oxide and optionally water can be made in a first reactor, and can be heating in the first reactor to form a crude product. The crude product can then be transferred to a second reactor and annealed. The second reactor can be, for example, a hot gas in a fluidized bed reactor. By preparing lithium metal oxides using such a process, heat treatment times can be decreased, heat distribution can be more homogeneous, loss of lithium throughout the heating process can reduced, more precise oxidation state adjustments can be obtainable, and substantially no dust-like material tends to be produced due to mechanical stresses. When used in a battery, the resulting product can exhibit extended battery cell life and higher energy density, which can lead to an improved battery pack life and performance.

In principle, any lithium salt can be used in the process of the present technology. Some examples of particularly suitable lithium salts include, but are not limited to, lithium oxide ($Li_2O$), lithium hydrorixde (LiOH), lithium chloride (LiCl), lithium nitrate ($LiNO_3$), lithium carbonate ($Li_2CO_3$), lithium sulfate ($Li_2SO_4$), lithium carboxylates, and mixtures thereof. Examples of suitable lithium carboxylates include, for example, lithium formate ($CHLiO_2$), lithium actetate ($CH_3COOLi$), and mixtures thereof.

Suitable metals compounds that can be used in metal oxides include, for example, boron (B), aluminum (Al), titanium (Ti), vanadium (V), Chromium (Cr), manganese (Mn), iron (Fe), colbalt (Co), nickel (Ni), zirconium (Zr), niobium (Nb), molybdenum (Mo), ruthenium (Ru), tungsten (W), and mixtures thereof. In one example, manganese or manganese compounds, including manganese oxides, are preferred. Examples of particularly suitable manganese compounds include, but are not limited to, manganese (II) oxide (MnO), manganese (IV) oxide ($MnO_2$), manganese (III) oxide ($Mn_2O_3$), manganous manganic oxide ($Mn_3O_4$), manganite (MnOOH), manganese carbonate ($MnCO_3$), manganese sulfate ($MnSO_4$), manganese dinitrate ($Mn(NO_3)_2$), manganese formate ($Mn(CHO_2)_2$), manganese acetate ($Mn(CH_3COO)_2$), and mixtures thereof.

Substantially all lithium metal oxides can be prepared by the processes of the present technology, provided that the lithium can be liberated electrochemically from these oxides, i.e. the metals apart from the lithium present in the oxide are not in their highest oxidation state.

Some examples include:

$Li_xTiO_2$ ($0<x\leq1$), $Li_xTi_2O_4$ ($0<x\leq1$), $Li_xV_2O_4$ ($0<x\leq2,5$), $Li_xV2O_3$ ($0<x\leq3,5$), $Li_xVO_2$ ($0<x\leq1$), $Li_xCr_2O_3$ ($0<x\leq3$), $Li_xCr_3O_4$ ($0<x\leq3,8$), $Li_xMnO_2$ ($0<x\leq2$), $Li_xMn_2O_4$ ($0<x\leq2$), $Li_xMn_2O_3$ ($0<x\leq1$), $Li_xFe_2iO_3$ ($0<x\leq2$), $Li_xFe_3O_4$ ($0<x\leq2$), $LiCoO_2$, $LiNiO_2$, $LixZrO_2$ ($0<x\leq1$), $LixNbO_2$ ($0<x\leq2$), $LixMoO_2$ ($0<x\leq2$), and $LiRuO_2$ ($0<x\leq1$), $LixWO_2$ ($0<x\leq1$), $LixWO_3$ ($0<x\leq1$).

In some embodiments, lithium metal oxides prepared using the process of the present technology cab include an additional metal or a mixture of two or more metals as a dopant. The dopant can be used to treat the surface of the lithium metal oxides to prevent dissolution of $Mn^{3+}$ which may occur during reaction of the starting materials. Suitable dopants include, for example, a metal of one of groups IIa, Ma, IVa, IIb, IIIb, IVb, VIIb, VIIb or VIII, and mixtures of two or more thereof. Examples of particularly suitable metals include, for example, iron, cobalt, nickel, titanium, aluminum, and mixtures thereof. Such metal-doped lithium manganese oxides can be prepared using a compound, such as a salt, of a metal or a mixture thereof, as defined above. In some examples, the dopant can include an iron salt, a cobalt salt, a nickel salt, or a mixture thereof.

In a process of the present technology, a lithium salt and a metal oxide can be mixed to form a mixture. The step of mixing the lithium salt and the metal oxide can be done within or outside of a first reactor. The mixture can be heated in the first reactor to form a crude product. The first reactor can be, for example, an autoclave, pusher furnace, rotary furnace, or a calciner. In one example, the lithium salt and the metal oxide can be hydrothermally treated, i.e. prepared from heated aqueous solutions at autogenous pressure. One example of such a method may be found in DE-19654688.5, which is incorporated herein by reference.

For example, a mixture including water, lithium hydroxide and manganese dioxide can be hydrothermally treated in an autoclave to form a crude product of lithium metal oxides. Combining and hydrothermally treating the lithium salt, metal oxide and water in an autoclave allows for substantial control of the materials, leading to high reproducibility. In addition, because autoclaves are typically run at lower temperatures than other hydrothermal equipment, such as pusher furnaces, the process also uses less energy. While stirring, the mixture may be heated to an internal temperature and maintained at this temperature for a predetermined amount of time under autogenous pressure. In one embodiment, the internal temperature can be about 165° C. and the predetermined amount of time can be about 18 hours. In other embodiments, the crude product can be obtained in the reaction by, for example, heating the product to a temperature of between about 50° C. to about 300° C., particularly between about 100° C. and about 200° C., and more particularly between about 120° C. and about 135° C. at autogenous pressure for a reaction time of between about 2 and about 48 hours. In one embodiment, the crude product may be dried using microwave energy.

Depending on the components employed, the reaction can also be followed by one or more washing steps to remove dissolved impurities from the crude product that can be present in the metal salts employed, such as, for example, sulphates, sodium (Na) and potassium (K) salts, and other components which are not a constituents of the desired lithium oxides.

If a relatively large amount of lithium is used in order to allow for some loss during the reaction, the lithium content can be reduced or a general reduction can also be carried out after the actual reaction by acid leaching in order to reach the desired stoichiometric amount. If acid leaching is carried out, it is typically carried out before the optional drying step and either before or after the heat treatment steps. While the acid leaching step may also be carried out after the heat treatment steps, the lithium is more difficult to remove as the lithium builds onto the metal oxide when heat is applied.

The crystallinity and the specific surface area of the lithium metal oxide obtained by the process of the present technology can be influenced by targeted control of the temperature, pressure and reaction time during the reaction and/or drying steps as well as by targeted control of the pressure and the reaction time in the heat treatment process. A lithium metal oxide produced by hydrothermally treating the lithium salt, metal oxide and water will typically have a crystallization of about 19% of the desired crystal phase.

To further refine the crystallinity of the lithium metal oxide contained in the crude product, the processes of the present technology include at least one annealing step. The annealing step can be conducted in a second reactor which can be a fluidized bed reactor. During fluidized bed annealing, the crude product can be placed on a sieve and hot gas can be blown from the bottom of the sieve through the crude product, causing the crude product to slightly levitate above the sieve such that the heat can reach all of the particles, allowing for a homogeneous temperature distribution through the entire batch. In one embodiment, the fluidized bed reactor can be preheated to a temperature of about 143° C. or greater. The step of annealing can be done at a temperature from about 600° C. to about 1000° C., and can be carried out for an amount of time from about 1 hour to about 24 hours. In one example, a fluidization gas flow can be adjusted from about every 100° C. to about 150° C. to maintain the gas velocity until a target temperature is reached within the second reactor. An exemplary target temperature is between about 770° C.

and about 775° C. The annealing step can be carried out in an open system, so there is no pressure build-up.

Once the target temperature is reached in the reactor, a hold time can be started during which the annealing is continued. If desired, a sample of the lithium oxide can be taken periodically, such as about every hour, for purposes of analysis and precision. In one embodiment, the hold time can be up to about 5 hours. After each hour, the process can be stopped and the second reactor can be allowed to cool down. When the temperature drops below a predetermined temperature, the reactor can be dipped into a cooling vessel and quenched to a target temperature. In one example, the predetermined temperature is about 500° C. and the target temperature is below about 50° C.

In one embodiment, after annealing step, the lithium oxide in the annealed product can have a crystallization of about 100%, or from about 98% to about 100%, as determined by X-Ray measurement and Rietveld refinement, a measurement method that can have a range of error from about 1% to about 2%. Such high levels of crystallinity cannot be achieved with rotary type furnaces or crucibles placed in conventional ovens for microwave heat treatment, due to the varying layers of the product in the furnace or conventional oven. The varying thickness of the product may create "hot spots" within the product and result in an inconsistent temperature profile. When used in an electrochemical cell, the temperature profile history is important because an inconsistent temperature profile can lead to cell-to-cell variability. Because the performance of the product is driven by the weakest cell, the overall performance of the product will decrease.

Using the annealing step can result in substantially all of the lithium oxide particles having substantially the same temperature profile history and substantially the same oxygen partial pressure. For example, in one embodiment, more than about 90%, about 95%, about 98% and about 99% of all of the particles have substantially the same temperature profile history and substantially the same oxygen partial pressure. A consistent temperature profile history and oxygen partial pressure is critical to batch consistency. If the temperature profile is inconsistent, this may lead to individual particles having different stoichiometries due to the difference in oxygen loss and oxygen partial pressures. As previously mentioned, a precise stiochiometry is critical to the effectiveness of any electrochemical cell in which the lithium oxide is used. The size of the crystal cell unit will also be different, influencing the intercalation behavior of the lithium. In addition, the oxidation state of the manganese will be different, effecting battery performance. Generally, as the amount of lithium increases, the oxidation state of the manganese decreases. The balance between the amount of lithium and the manganese oxidation state in the lithium manganese oxide relates to the energy storage capacity and electrical conductivity of an electrochemical cell. Thus, an appropriate balance between the two can improve the performance of the electrochemical cell.

The capacity of a material to store electricity as chemical energy in a substance is measured in mAh/g. In one embodiment, the initial capacity of lithium oxides produced in accordance with the processes discussed herein can be between about 80 and about 300 mAh/g and particularly at least about 110 mAh/g. In one embodiment, lithium metal oxides produced by the method of the present technology have an average crystal size of about 5 microns to about 20 microns and a BET surface of about 0.5 m$^2$/g to about 2.5 m$^2$/g. In one embodiment, the crystallinity of the lithium metal oxides have a lattice constant of between about 821 and 825 pico meters.

Figure 2:
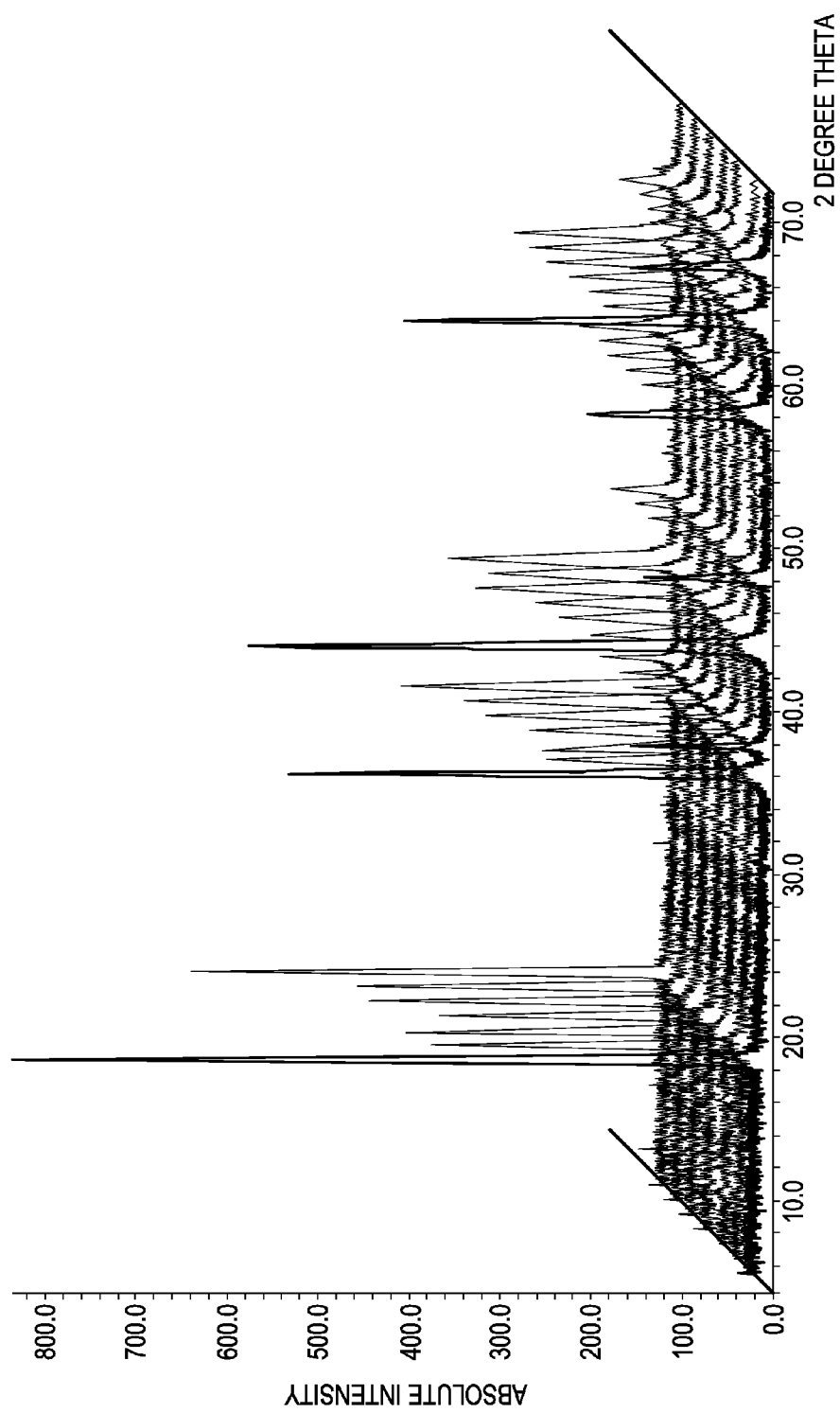
FIG. 2 is an XRD diagram of $MnO_2$ after fluidized bed annealing.

FIG. 1 shows an X-ray diffraction (XRD) diagram of $MnO_2$ starting material and materials obtained by hydrothermal treatment at varying temperatures and FIG. 2 shows an XRD diagram of $MnO_2$ after fluidized bed annealing. The diagram in FIG. 1 is read from bottom to top and shows X-ray measurements of the $MnO_2$ starting material in the bottom graph and the materials obtained by hydrothermal treatment with increasing process temperatures. The top graph shows the materials at the highest temperature. As can be seen by the peaks in the graph, the lithium has already been integrated into the metal oxide. This is evidenced by comparing the changes of the peaks in the diagram to the peaks of an X-Ray measurement of the final product, shown in FIG. 2, in which the red dotted line shows peaks of the desired phase. FIG. 1 shows the ability to provide control over the stoichiometry of the final product using the method of the present technology. Thus, the fluidized bed treatment of the present technology is a final polishing step designed to run subsequent to the main reaction step. In this way, only one product is filled into the furnace, rather than two or more starting materials that have to undergo a chemical reaction during heat treatment. Fluidized bed annealing provides a substantially homogeneous temperature profile despite the poor thermal conductivity of the material so that every particle has the same temperature history and there is control over the oxygen partial pressure (oxygen is typically lost during heat treatment) via the hot gas that is used to bring in the heat and to fluidize the material.

Exemplary gases that may be used to fluidize the mixture in the fluidized bed reactor can include, without limitation, argon, nitrogen, and nitrogen-air mixtures. The oxygen partial pressure in nitrogen/oxygen mixtures can be utilized to adjust the metal oxide oxidation state to between about +3 and about +4. In particular, the oxidation state is between about +3.5 and about +3.6.

The fluidization allows the crude product to be heated quickly with a quick temperature ramp up and ramp down, shortening the overall heat treatment time to less than about 8 hours. Depending on the parameters desired (i.e., Brunauer-Emmett-Teller (BET), Mn oxidation state) the overall heat treatment time can be between about 2 and about 7 hours. Although the process is described as including one heat treatment step, the process may include more than one heat treatment step without departing from the intended scope of the present technology.

As previously discussed, lithium metal oxides produced by the hydrothermal treatment and subsequent heat treatment steps of the present technology can have a refined crystallinity that can approach up to about 100%. The crystallinity and the specific surface area of the lithium metal oxide obtained by the process of the present technology can be influenced by various factors, including, for example, temperature, pressure and reaction time during the reaction, and drying and holding time during fluidized bed annealing.

The particle size of the lithium metal oxides obtained using processes according to the present technology can be influenced by taking into account the particle fineness of the manganese raw materials used by prior wet or dry milling. Likewise, milling the wet or dried lithium metal oxide to reduce the particle size is possible.

In one embodiment, a lithium metal oxide prepared using the process of the present technology can be an intercalation compound. Intercalation compounds can store lithium ions in a host lattice with the lithium being incorporated in interstitial sites in the lattice of the host material. The incorporation and release of the lithium ions in the host lattice can be affected electrochemically by an electrolyte which conducts lithium ions and has high reversibility. Examples include, but are not limited to: LiClO$_4$, LiBF$_4$, LiPF$_6$, LiSO$_3$CF$_3$, LiAsF$_6$ and LiBOB. When two different intercalation compounds having very different electrochemical potentials are combined, they form an electrochemical cell in which lithium ions migrate back and forth between the host materials during charge and discharge operations. Electrochemical cells of this type are known as lithium ion batteries. In one embodiment, a carbon-containing substance such as graphite or coke is particularly suitable as a host material for the anode. Accordingly, intercalation compounds are particularly useful for use in electrochemical cells.

The lithium metal oxide produced by the process can be used as at least part of the cathode material for electrochemical cells. In one embodiment, the cathode material also includes a binder such as polytetrafluoroethylene (PTFE) or carbon black. When the lithium metal oxide is used as the cathode, substantially any material can be used as the anode as long as the compounds are able to incorporate lithium ions and have a different electrochemical potential than the electrode described. In one embodiment, the anode includes, as the host material, a carbon-containing substance as defined above or metallic lithium.

When used in the cathode material for an electrochemical cell, lithium metal oxide produced by processes of the present technology can be used in the same way as other lithium metal oxides that are known in the art. In an electrochemical cell, the cathode is used opposite an anode which takes up lithium cations. In the fully assembled and closed state, the electrodes are usually uncharged, i.e. all available lithium is incorporated in the positive electrode while the host structure of the negative electrode is not loaded with lithium. When charged for the first time, the lithium migrates from the positive host lattice (cathode) and is incorporated into the negative host lattice (anode), such as a carbon matrix. Any proportion of the lithium ions which become irreversibly bound to the carbon matrix, and thus are no longer available to further the intercalation mechanism, can be compensated for by a super-stoichiometric amount of lithium in the lithium metal oxide. The in-principle structure of such a electrochemical cell is known and is described, for example, by J. M. Tarascon in J. Electrochem. Soc. 140, p. 3071 ff.

The life of the battery can be extended due to the stoichiometric accuracy allowed by the process of the present technology, resulting in structural stability of the cathode. The consistent cathode material reduces cell-to-cell variability. Because the battery pack performance is driven by the weakest cell in the pack, the reduced variability can increase the overall pack performance. The life of the battery can also be extended by using dopants to treat the surface of the lithium metal oxide to prevent dissolution of the metal.

EXAMPLES

The present technology is more particularly described in the following examples that are intended as illustrations only, since numerous modifications and variations within the scope of the present technology will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Example 1

Benchmark

To determine a benchmark capacity of samples that were tested in batteries, a slurry of about 82% lithium metal oxide, about 4% Super P carbon black Li, about 4% graphite KS6 and about 10% PVDF Solef 21216 in acetone was first made. The slurry was then cast onto aluminum foil at a thickness of about 25 microns and the solvent was evaporated. The coated foil was cut into round-shaped pieces having a diameter of about 18 mm and dried at about 90° C. in an about 1 mbar vacuum (an 80 micron thick coating is equivalent to about 20 mg lithium metal oxide per disc).

A coin cell type battery was assembled using the prepared discs as a cathode and lithium foil as an anode. The cathode and anode were separated by a glass cloth separator. The cell was then filled with electrolyte (1 mol/L lithiumhexafluorophosphate in a blend of 1:1 ethylene carbonate/dimethyl carbonate by volume). The battery was charged to about 4.3 V at a C-rate of about one third and a discharge of about 3.0 V. The specific capacity was then calculated from the weight of the electrode and the delivered charge. The benchmark samples had a capacity measured at about 90-110 mAh/g.

Example 2

Preparation of Lithium-Manganese Oxide

About 4 liters of water was introduced into a 10 liter autoclave. Subsequently, about 1114 grams lithium hydroxide and about 4000 grams of manganese dioxide were added into the autoclave to form a mixture. While stirring, the mixture was heated to an internal temperature of about 165° C. and kept at this temperature for about 18 hours under autogenous pressure. The solid phase was then separated from the aqueous phase by filtration and washed with about 2 liters of water.

The solid lithium-manganese oxide formed was used in the Examples below.

Example 3

A batch of 8,698 kg of lithium-manganese oxide was introduced into a fluidized bed reactor. The reactor was closed and put into a fluidized bed oven preheated to about 143° C. The starting fluidization air flow was set to about 5.2 Nm$^3$/h of air, corresponding to a gas velocity of about 9 centimeters per second (cm/s). The fluidizing gas flow was adjusted about every 100-150° C. to maintain the gas velocity. The target temperature was determined to be about 770° C. To reach the target temperature, the reactor was initially set to about 750° C. and was then adjusted to between about 770° C. and about 775° C.

A Blow-Back cleaning system was set to pulse about every 30 seconds in each zone and subsequently changed to about every 60 seconds. The target temperature was achieved and a hold time of about 5 hours was started. A sample was taken about every hour. After each hour elapsed, the process was stopped and the reactor pulled from the oven and allowed to cool down. The fluidizing gas flow was adjusted about every 100 to about 150° C. to keep the gas velocity at about 9 cm/s. When the temperature dropped below about 500° C., the reactor was dipped into a cooling vessel and quenched to below about 50° C.

The initial capacity of the material in a Li-Ion battery was about 113 mAh/g.

Example 4

About 8520 grams of solid lithium-manganese oxide was dried and annealed in a fluidized bed reactor in batch mode at about 770° C. The reactor was closed and put into a fluidized bed oven preheated to about 178° C. The starting fluidization air flow was set to about 5.2 Nm³/h of air, corresponding to a gas velocity of about 9 cm/s. The fluidizing gas flow was adjusted about every 100 to about 150° C. to maintain the gas velocity. The target temperature was determined to be about 770° C. To reach the target temperature, the reactor was initially set to about 750° C. and was then adjusted to between about 770° C. and about 775° C.

A Blow-Back cleaning system was set to pulse about every 60 seconds in each zone. After about 2.5 hours, the target temperature was achieved and a hold time of about 5 hours was started. A sample was taken about every hour. After about 5 hours the process was stopped and the reactor was pulled from the oven and allowed to cool down. The fluidizing gas flow was adjusted every about 100 to about 150° C. maintain the gas velocity at about 9 cm/s. When the temperature dropped below 500° C. the reactor was dipped into a cooling vessel and quenched to below 50° C.

The initial capacity of the material in a Li-Ion battery was 115 mAh/g.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A process for producing a lithium metal oxide having an average crystal size of from about 5 microns to about 20 microns, the process comprising the steps of:
    mixing a lithium salt and a metal compound to form a mixture;
    heating the mixture in a first reactor to form a crude product; and
    annealing the crude product in a second reactor to form an annealed product comprising lithium metal oxide, wherein the second reactor is a fluidized bed reactor.

2. The process of claim 1, wherein the lithium metal oxide has an average BET surface of from about 0.5 to about 2.5 m²/g.

3. The process of claim 1, wherein an oxidation state of the metal in the lithium metal oxide is from about +3 to about +4.

4. The process of claim 1, wherein the lithium salt is selected from the group consisting of: $Li_2O$, LiOH, LiCl, $LiNO_3$, $Li_2CO_3$, $LiSO_4$, lithium carboxylates, and mixtures thereof.

5. The process of claim 1, wherein the metal compound comprises a metal selected from the group consisting of: B, Al, Ti, V, Cr, Mn, Fe, Co, Ni, Zr, Nb, Mo, Ru, W, and mixtures thereof.

6. The method of claim 5, wherein the metal compound is selected from the group consisting of: MnO, $MnO_2$, $Mn_2O_3$, $Mn_3O_4$, MnOOH, $MnCO_3$, $MnSO_4$, $Mn(NO_3)_2$, $Mn(CHO_2)_2$, $Mn(CH_3COO)_2$, acetate, and mixtures thereof.

7. The process of claim 1, wherein a gas in the fluidized bed reactor is selected from the group consisting of argon, nitrogen, and nitrogen-air mixtures.

8. The process of claim 1, wherein the lithium metal oxide has a capacity of from about 100 mAh/g to about 140 mAh/g.

9. The process of claim 1, wherein the first reactor is selected from the group consisting of an autoclave, pusher furnace, rotary furnace, and a calciner.

10. The process of claim 1, wherein the step of annealing comprises annealing the crude product in the second reactor at a temperature from about 600° C. to about 1000° C. for an amount of time from about 1 to about 24 hours to form the annealed product.

11. The process of claim 10, wherein the amount of time is less than about 8 hours.

12. The process of claim 1, further comprising the step of: cooling the annealed product.

13. The process of claim 12, wherein the annealed product is cooled to a temperature at or below about 50° C.

14. The process of claim 1, further comprising the step of: drying the annealed product.

15. The process of claim 1, further comprising the step of: acid leaching the annealed product.

16. The process of claim 1, further comprising a step of washing the crude product to remove impurities.

* * * * *